(12) United States Patent
Lide

(10) Patent No.: US 7,773,639 B2
(45) Date of Patent: *Aug. 10, 2010

(54) SYNCHRONIZATION OF VOICE PACKET GENERATION WITH TRANSMISSION OPPORTUNITIES IN A WIRELESS NETWORK

(75) Inventor: David Lide, Rockville, MD (US)

(73) Assignee: Texas Instruments Incorporated, Dallas, TX (US)

( * ) Notice: Subject to any disclaimer, the term of this patent is extended or adjusted under 35 U.S.C. 154(b) by 792 days.

This patent is subject to a terminal disclaimer.

(21) Appl. No.: 11/528,765

(22) Filed: Sep. 28, 2006

(65) Prior Publication Data

US 2008/0080561 A1 Apr. 3, 2008

(51) Int. Cl.
*H04J 3/06* (2006.01)
(52) U.S. Cl. .................. 370/519; 370/503; 370/516
(58) Field of Classification Search ............. 73/593, 73/660, 659, 587, 646; 702/56
See application file for complete search history.

(56) References Cited

U.S. PATENT DOCUMENTS

| | | | |
|---|---|---|---|
| 6,181,716 B1 * | 1/2001 | Lide | 370/519 |
| 6,470,031 B1 * | 10/2002 | Loy et al. | 370/503 |
| 2003/0043744 A1 * | 3/2003 | Lu et al. | 370/236 |
| 2005/0117609 A1 * | 6/2005 | Ohkawa | 370/517 |
| 2005/0135318 A1 | 6/2005 | Walton et al. | |
| 2005/0195776 A1 | 9/2005 | Xu | |
| 2006/0129848 A1 * | 6/2006 | Paksoy et al. | 713/193 |
| 2006/0165046 A1 | 7/2006 | Del Prodo Pavon | |
| 2007/0014269 A1 * | 1/2007 | Sherman et al. | 370/338 |
| 2007/0238483 A1 * | 10/2007 | Boireau et al. | 455/553.1 |

* cited by examiner

*Primary Examiner*—Phuc Tran
(74) *Attorney, Agent, or Firm*—Steven A. Shaw; W. James Beady; Frederick J. Telecky, Jr.

(57) ABSTRACT

One embodiment of the present invention includes a method for synchronizing packet production and receipt from a digital signal processor (DSP) with polled transmission opportunities in an IEEE 802.11e network. The method comprises producing a packet via the DSP and transmitting the packet from the DSP to a transmission device at a time that is substantially synchronized with a next polled transmission opportunity granted by an access point in an IEEE 802.11(e) network. The method also comprises time stamping the arrival of the packet at the transmission device and transmitting the packet from the transmission device.

14 Claims, 2 Drawing Sheets

SYNCHRONIZATION OF VOICE PACKET GENERATION WITH TRANSMISSION OPPORTUNITIES IN A WIRELESS NETWORK

TECHNICAL FIELD

This invention relates to communications, and more specifically to synchronization of voice packet generation with transmission opportunities in a wireless network.

BACKGROUND

Wireless local area networks (WLANs) have been developed for various commercial and residential applications. Such networks allow for mobile terminals to be moved within a particular service area without regard to a physical connection to the network. To enable communications in the WLAN, various wireless standards have been developed, including the IEEE 802.11x standard, Blue Tooth, and HIPERLAN, to name a few. A WLAN typically includes an Access Point (AP) and one or more stations. Each station may be a device such as a notebook computer, personal digital assistant (PDA), wireless VoIP telephone, or the like that transmits radio signals to and receives radio signals from other stations in the local area network via the AP.

In an IEEE 802.11(e) wireless communication standard, a mode of operation for enhanced quality of service (QoS) has been provided. The mode of operation, called a hybrid coordination function, allows a QoS control entity to have prioritized access to the communication medium. The QoS control entity, called hybrid controller (HC), can be located in an IEEE 802.11 AP. The prioritized access to the medium allows the HC to allocate transmission opportunities to voice stations via a polling mechanism, known as contention-free polling. Therefore, in an IEEE 802.11(e) WLAN, voice packet polled transmission opportunities can be periodically granted to an 802.11 communication device.

Unlike callers in a circuit-switched telephone network who are allocated a dedicated connection, users of wireless standards, such as IEEE 802.11(e), do not occupy a fixed amount of bandwidth during their online sessions but instead share the network with other online users, only using network resources when sending and receiving data in quick bursts. Users typically grab what they need from the available bandwidth at the instant they need to upload their packets. A module that generates packets, such as a digital signal processor (DSP) is typically separate from the module that transmits the data. Thus, transmission of packets can typically include packet wait times as well as latency, especially when the different modules reside on different physical hardware and are not running synchronized clocks. Delays in the transmission of voice packets can significantly degrade voice quality.

FIG. 1 demonstrates a prior art example of a timing diagram 10 associated with the transmission of packets in a wireless communication device. The timing diagram 10 can represent, for example, transmission of packets in a wireless communication device in an IEEE 802.11(e) WLAN. An HC in an IEEE 802.11(e) WLAN provides polled transmission opportunities, demonstrated in the example of FIG. 1 as $T_{XMIT}$, at predetermined time intervals $N_1$. The production and transmission of packets, such as voice packets, from a digital signal processor (DSP) to a transmission device can thus be performed at the predetermined time intervals $N_2$, such that the packets are produced and transmitted to the transmission device at fixed time slots. The predetermined time intervals $N_1$ and $N_2$ can be substantially equal, such that each polled transmission opportunity can be used to transmit a packet.

At a time $T_0$, a packet is generated and transmitted from the DSP to the transmission device, demonstrated in the example of FIG. 1 as $T_{PKT}$. At a time $T_1$, the packet is received by the transmission device. A propagation delay (i.e., latency) associated with the time that it takes for the packet to be transmitted from the DSP to the transmission device is demonstrated by the time interval P. However, the next polled transmission opportunity for the transmission device to transmit the packet does not occur until the time $T_2$. At the time $T_2$, the transmission device transmits the packet, demonstrated in the example of FIG. 1 as $T_{XMIT}$. The transmission of the packet from the transmission device is delayed by a wait time interval W. Thus, a delay time interval D includes both the propagation delay interval P and the wait time interval W.

At the time $T_3$, the next packet is generated and transmitted from the DSP to the transmission device. Accordingly, the next packet arrives at the transmission device at the time $T_4$, and is transmitted from the transmission device at the time $T_5$. The generation and transmission of the next packet is again repeated at the times $T_6$, $T_7$, and $T_8$.

In this prior art example of FIG. 1, the production and transmission of the packets, as well as the polled transmission opportunities, are separated by the substantially equal time intervals $N_1$ and $N_2$. As such, the delay time interval D is constant. As demonstrated in the example of FIG. 1, the wait time interval W is the same between the times $T_1$ and $T_2$, the times $T_4$ and $T_5$, and the times $T_6$ and $T_8$. As such, each of the transmitted packets has an additional delay of W. For voice packets, this additional delay can cause a significant reduction of voice quality.

SUMMARY

One embodiment of the present invention includes a method for synchronizing packet production and receipt from a digital signal processor (DSP) with polled transmission opportunities in an IEEE 802.11e network. The method comprises producing a packet via the DSP and transmitting the packet from the DSP to a transmission device at a time that is substantially synchronized with a next polled transmission opportunity granted by an access point in an IEEE 802.11(e) network. The method also comprises time stamping the arrival of the packet at the transmission device and transmitting the packet from the transmission device.

Another embodiment of the present invention includes a system for synchronizing the transmission of packets with polled transmission opportunities in a transmission device in an IEEE 802.11e network. The system comprises a digital signal processor (DSP) configured to produce the packets in fixed time slots and a transmission device configured to receive the packets transmitted from the DSP and to transmit the packets at the polled transmission opportunities granted by an access point in an IEEE 802.11(e) network. The system also comprises a calculator configured to determine a wait time between an arrival of each of the packets at the transmission device and the polled transmission opportunities and a synchronizer configured to transmit a sync request to the DSP, such that the DSP is further configured to adjust the production and transmission of the packets based on the determined wait time.

Another embodiment of the present invention includes a system for synchronizing the transmission of packets with polled transmission opportunities in a transmission device in an IEEE 802.11e network. The system comprises means for producing the packets in fixed time slots and means for wirelessly transmitting the packets at the polled transmission opportunities granted by an access point in an IEEE 802.11(e) network. The means for transmitting receives the packets from the means for producing the packets. The system also comprises means for generating a shift time associated with the production of the packets, such that the means for producing the packets adjusts production of the packets based on the shift time.

DETAILED DESCRIPTION

This invention relates to communications, and more specifically to synchronization of voice packet generation with transmission opportunities in a wireless network. Synchronization of voice packet generation with transmission opportunities is to ensure that packet transmission delay in a wireless transmitter is minimized by having the voice or data processed, packetized, and ready to be transmitted by the transmitter as close to the transmission opportunity as possible. Voice quality can be increased in such a wireless network due to the detrimental impact of delay on voice quality.

Figure 2:
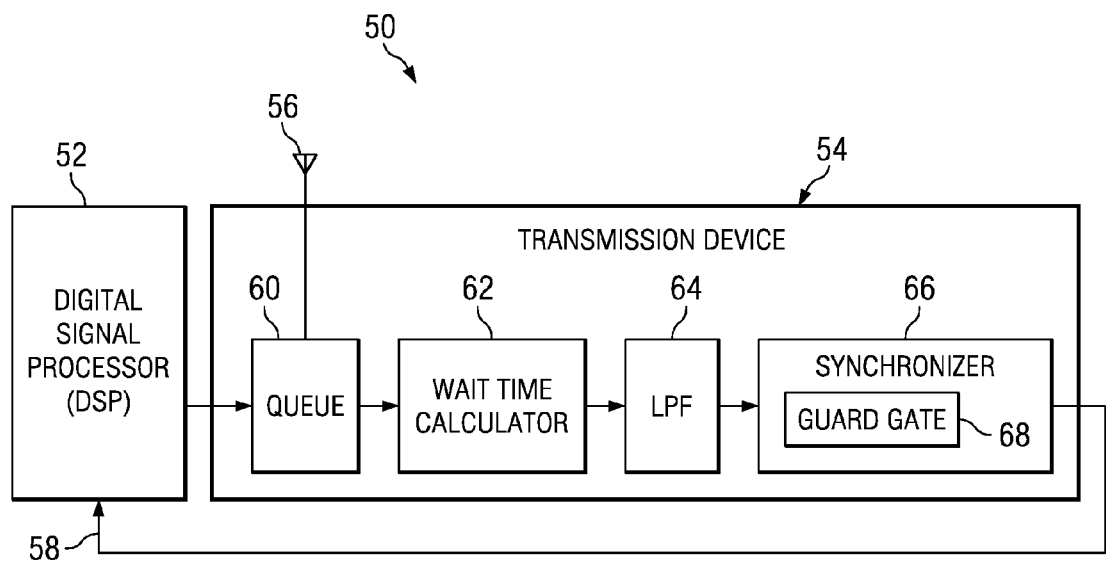
FIG. 2 illustrates an example of a wireless communication station in accordance with an aspect of the invention.

FIG. 2 illustrates an example of a wireless communication station 50 in accordance with an aspect of the invention. The wireless communication station 50 can be included in an IEEE 802.11(e) wireless local area network (WLAN). As such, the wireless communication station 50 can be one of a plurality of stations that are serviced by a common access point (AP). The AP can include a hybrid controller (HC) configured to provide polled transmission opportunities.

The wireless communication station 50 includes a digital signal processor (DSP) 52 that is configured to generate packets. The packets can include voice packets, as well as data packets. The DSP 52 transmits each of the generated packets to a transmission device 54. The transmission device 54 can be a modem and/or a transceiver that is configured to wirelessly transmit and receive packets via an antenna 56.

Figure 1:
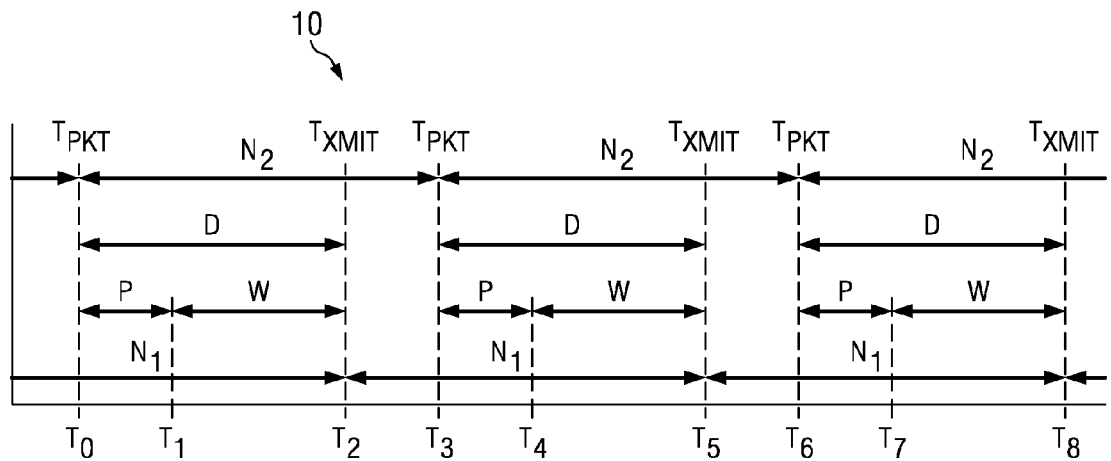
FIG. 1 illustrates a prior art example of a timing diagram associated with the transmission of packets in a wireless communication device.

As described above in the example of FIG. 1, each of the transmitted packets can have a wait time interval W that is a delay associated with the time from arrival of the packet at the transmission device 54 to the time of the next polled transmission opportunity. For voice packets, this additional delay can cause a significant reduction of voice quality. Therefore, to minimize the wait time interval W of each transmitted packet, the wireless communication station 50 can synchronize (hereinafter "sync") the production and transmission of the packets from the DSP 52 to the transmission device 54, such that the packets arrive at the transmission device 54 just in time for transmission at the next polled transmission opportunity. In the example of FIG. 2, the transmission device 54 can be configured to issue a sync request to the DSP 52 via a loopback connection 58.

A sync operation seeks to minimize the delay time interval D. The propagation delay P varies but has a determinable upper limit $P_{MAX}$. $P_{MAX}$ is a configuration parameter and could be determined by measuring the worst case voice packet transfer time from the DSP 52 to the transmission device with a logic analyzer or similar tools. The DSP 52 could periodically measure $P_{MAX}$ by timing the round-trip delay to send/receive this message and dividing the timing by two. This value could then be reported to the transmission device 54 to use as $P_{MAX}$, as described in greater detail below. Because the propagation delay P cannot be minimized, the sync request is configured to minimize the wait time interval W.

Figure 3:
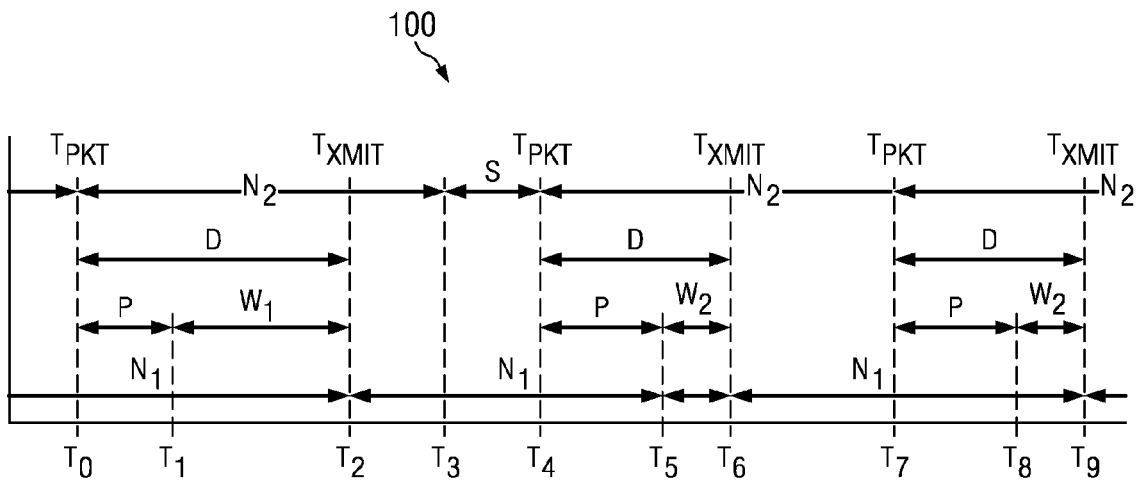
FIG. 3 illustrates an example of a timing diagram associated with the transmission of packets in a wireless communication device in accordance with an aspect of the invention.

The creation and issuance of a sync request to minimize the wait time interval W is discussed in greater detail with additional reference to FIG. 3. FIG. 3 illustrates an example of a timing diagram 100 associated with the transmission of packets in a wireless communication device in accordance with an aspect of the invention. The timing diagram 100 in the example of FIG. 3 could represent the wireless communication station 50 in the example of FIG. 2. As such, reference will be made to the example of FIG. 2 in the discussion of FIG. 3.

The timing diagram 100 can represent transmission of packets in an IEEE 802.11(e) WLAN. Thus, an HC can provide polled transmission opportunities, demonstrated in the example of FIG. 3 as $T_{XMIT}$, at predetermined time intervals $N_1$. The production and transmission of packets, such as voice packets, from the DSP 52 to the transmission device 54 can thus be performed at the predetermined time intervals $N_2$, such that the packets are produced and transmitted to the transmission device at fixed time slots. The predetermined time intervals $N_1$ and $N_2$ can be substantially equal, such that each polled transmission opportunity can be used to transmit a packet.

At a time $T_0$, a packet is generated and transmitted from the DSP 52 to the transmission device 54, demonstrated in the example of FIG. 3 as $T_{PKT}$. At a time $T_1$, the packet is received by the transmission device 54. Upon the packet arriving at the transmission device 54, the packet is time stamped and stored in a queue 60. A propagation delay (i.e., latency) associated with the time that it takes for the packet to be transmitted from the DSP to the transmission device 54 is demonstrated by the time interval P. However, the next polled transmission opportunity for the transmission device 54 to transmit the packet does not occur until the time $T_2$. At the time $T_2$, demonstrated in the example of FIG. 3 as $T_{XMIT}$, the packet is time stamped again, and the transmission device 54 wirelessly transmits the packet via the antenna 56. Therefore, the amount of time that the packet is stored in the queue is approximately the wait time interval $W_1$. As an alternative to time stamping the packet upon wireless transmission, it is to be understood that timing information associated with the polled transmission opportunities can be communicated to the transmission device 54 via a received beacon frame.

The transmission device 54 includes a wait time calculator 62 and a low-pass filter (LPF) 64. The wait time calculator 62 calculates the wait time interval $W_1$ by computing the difference between the time stamps for the arrival of the packet at the queue 60 (i.e., the time $T_1$) and the transmission of the packet from the transmission device 54 (i.e., the time $T_2$). The calculated wait time interval $W_1$ is output from the wait time calculator 62 to the LPF 64. The LPF 64 can compute an average of wait time intervals W. For example, the LPF 64 can be configured to generate a moving average of wait times $W_{AVG}$.

As an example, when an IEEE 802.11(e) service flow for the voice stream is created, thus starting the polled transmission opportunities, the wait time calculator 62 can be provided with a sync function and pointer to a piece of opaque state data or a cookie. When the service flow transmit routine is called, the time is noted and the sync function is called with a PKT-ARR function code along with the cookie, which can be used to store the state of the LPF 64. After the packet has been transmitted, the wait time calculator 62 notes the time and calls the sync function with a PKT-XMIT function code. Internally, this has the effect of producing the moving average wait time $W_{AVG}$. One approach to this calculation is to use exponential smoothing. As an example, using this technique, the moving average of the wait times $W_{AVG}$ output of the LPF 64 can be determined as follows:

$$W_{AVG} = \alpha * W_1 + (1-\alpha) * W_{AVG}' \quad \text{Equation 1}$$

Where: α=smoothing factor (0<α>1)
$W_1$=the present wait time interval
$W_{AVG}'$=the previous value for $W_{AVG}$ In the example of Equation 1, α can be a tunable parameter and can be set so as to limit the impact of short duration oscillations in the measurement of the moving average of the wait time $W_{AVG}$. For example, α can be set so that at least K observations of maximal wait times W are observed before $W_{AVG}$ reaches a threshold for issuing sync requests to the DSP 52, as is described in greater detail below. In addition, the LPF 64 can provide a PKT-DROP function code, so that the wait time calculator 62 can negate observations in the case where the packet was never transmitted. Also, a PKT-IMT function code can allow the wait time calculator 62 to reset the moving average wait time $W_{AVG}$ after exceptional conditions, such as, for example, loss of upstream packet receiving equipment.

The LPF 64 outputs the moving average wait time $W_{AVG}$ to a synchronizer 66. The synchronizer 66 is configured to identify a need for new slot timing information for the production and transmission of packets by the DSP 52. To identify the need for new slot timing information, the synchronizer 66 compares the moving average wait time $W_{AVG}$ with a predetermined threshold wait time $W_T$. It is to be understood that the synchronizer 66 need not compare the moving average wait time $W_{AVG}$ with the threshold wait time $W_T$, but could instead merely compare the calculated wait time $W_1$ with the threshold wait time $W_T$. Upon the moving average wait time $W_{AVG}$ being greater than the threshold wait time $W_T$, the synchronizer 66 calculates a shift time S. The shift time S is transmitted in a sync request to the DSP 52 from the transmission device 54 via the loopback connection 58. In addition to the shift time S, a sync request can also include information identifying the message type, such that the sync request is appropriately identified, and information identifying a given voice channel within the DSP 52 for which the sync operation is being requested. Furthermore, it is to be understood that the shift time S need not be calculated by the synchronizer 66, but that the sync request can instead include the wait time W, such that the DSP 52 can calculate the appropriate shift time S.

The shift time S can be representative of an amount of time for which production and transmission of the next packet can be delayed, such that the wait time W can be reduced for subsequent packets. As such, the calculation of the shift time S can be based on the wait time W and the maximum amount of the propagation delay time interval $P_{MAX}$. For example, the shift time S can be based on the calculated wait time $W_1$ of the packet just released from the queue 60. As another example, the shift time S can be based on the moving average wait time $W_{AVG}$, such that:

$$S = W_{AVG} - P_{MAX} \quad \text{Equation 2}$$

Referring to FIG. 3, the shift time S is demonstrated as beginning at a time $T_3$. At the time $T_3$, the DSP 52 delays production and transmission of the next packet by the shift time interval S. As such, at a time $T_4$, demonstrated in the example of FIG. 3 as $T_{PKT}$, the next packet is generated and transmitted from the DSP 52 to the transmission device 54. At a time $T_5$, the packet is received by the transmission device 54, the receipt of the packet by the transmission device 54 being delayed by the propagation delay time interval P. Despite the delay in production and transmission of the next packet by the shift time interval S, the next polled transmission opportunity, occurring at a time $T_6$, for the transmission device 54 to wirelessly transmit the packet remains unchanged, such that it is still delayed from the previous polled transmission opportunity, occurring at the time $T_2$, by the time interval N. Therefore, the amount of time that the next packet is stored in the queue is approximately the wait time interval $W_2$, which is substantially less than the wait time interval $W_1$ of the previous packet.

To minimize the potential drop in voice quality, the DSP 52 can thus reduce the wait time W by sending the next packet later than normal, so that the next packet arrives at the transmission device 54 just in time for the next polled transmission opportunity. Since the DSP 52 can continuously send packets separated in time by the time interval N, the shift time interval S can effectively shift all subsequent packets sent by the DSP 52 to the transmission device. In this manner, the DSP 52 utilizes the sync request, and thus the shift time S therein, to redefine packet production and transmission time slots for the subsequent packets sent to the transmission device 54. As such, a sync request can provide new slot timing for the production and transmission of subsequent packets from the DSP 52 to the transmission device 54. In addition, instead of delaying generation and transmission of a packet based on the shift time S, the DSP 52 could also be configured to adjust the production and transmission of a packet earlier in time based on the relative timing between the shift time S and the polled transmission opportunities. For example, upon receiving a sync request prior to the time T0 and after generating a packet at the time $T_0$, the DSP 52 can generate and transmit the next packet prior to the time $T_2$ for transmission at the polled transmission opportunity at the time $T_2$. However, such a shift early, as opposed to a delay, may result in a lost packet.

In the example of FIG. 3, this is demonstrated by the packet produced and transmitted to the transmission device 54 at a time $T_6$ having an associated wait time interval $W_2$ between arrival at a time $T_8$ and wireless transmission at a time $T_9$. While this shift does not result in any loss of data for the subsequent packets, this delay may result in the loss of some information from the stream being sampled by the DSP 52 which should have been included in the first shifted packet. As an example, some data may be discarded as a result of more data being sampled than can be packaged in a single packet.

Since the DSP 52 employs the time interval N to equally space the production and transmission of all packets subsequent to the sync request, all future packets sent by the DSP 52 should arrive just in time for the respective polled transmission opportunity. As such, the DSP 52 can operate in a steady state of operation of substantially synchronizing packets to the polled transmission opportunities without frequent sync requests. However, a few sequential sync requests may be required before a steady state of operation is achieved. For example, there can be drift subsequent to a given sync operation, thus necessitating an additional sync operation. To accommodate the drift, the moving average wait time $W_{AVG}$ can be continually or periodically compared with the threshold wait time $W_T$. As such, upon the moving average wait time $W_{AVG}$ being greater than the threshold wait time $W_T$, the transmission device 54 can issue another sync request. Thereafter, packets produced and transmitted by the DSP 52 can once again be substantially synchronized with the polled transmission opportunities, such that they arrive at the transmission device 54 just in time to be wirelessly transmitted.

In the discussion of FIGS. 2 and 3, it is assumed that the DSP 52 is always able to perform a sync operation on the next packet following the one that triggered a sync request. However, it is to be understood that the DSP 52 may not always be able to perform a sync operation on the next packet it sends, such that the DSP 52 may transmit some number of packets in sequence before accomplishing a sync operation. As such, the synchronizer 66 may include a guard gate 68.

As an example, the transmission device 54 may not be able to send the sync request in time for a sync operation of the next packet. Additionally or alternatively, the DSP 52 may not be immediately able to sync the next packet upon receiving a sync request. As such, several packets in a row may arrive at the transmission device 54 that could trigger additional sync requests. To prevent sending a sequence of two or more identical sync requests to the DSP 52, once a sync request has been issued, the guard gate 68 may wait a predetermined number of packets before again comparing the moving average wait time $W_{AVG}$ against the threshold wait time $W_T$. Therefore, the guard gate 68 can inhibit both shift time S calculation and sync request generation for the predetermined number of packets to allow the sync operation to take effect.

Figure 4:
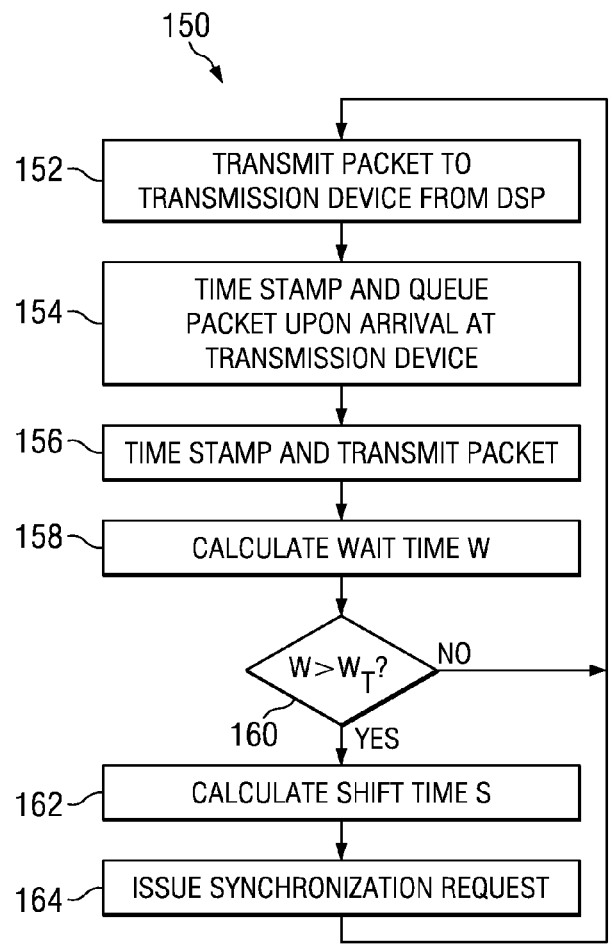
FIG. 4 illustrates an example of a method for synchronizing the transmission of packets with polled transmission opportunities in accordance with an aspect of the invention.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., a computer or a computer network), software (e.g., as executable instructions running on one or more computer systems), or any combination of hardware and software.

FIG. 4 illustrates an example of a method 150 for synchronizing the transmission of packets with polled transmission opportunities in accordance with an aspect of the invention. The method 150 can be implemented in an IEEE 802.11(e) wireless communication station. At 152, a packet is produced by a DSP and transmitted from the DSP to a transmission device. The packet can be a voice packet or a data packet. The transmission device can be a modem or a wireless transceiver configured to operate on an IEEE 802.11(e) WLAN. At 154, the packet is time stamped and queued upon arriving at the transmission device. The arrival of the packet at the transmission device could have been delayed by a propagation delay time.

At 156, the packet is time stamped and transmitted from the transmission device. The transmission can be a wireless transmission via an antenna. In addition, the transmission can occur at a polled transmission opportunity, as dictated by an HC in an IEEE 802.11(e) WLAN. At 158 a wait time W is calculated for the packet. The wait time W can represent an amount of time that the packet remained in the queue before being wirelessly transmitted. As such, the wait time W can be a difference between the time stamp of arrival of the packet in the transmission device and the time stamp of transmission from the transmission device. The wait time W can also be output to an LPF, such that the LPF can calculate a moving average wait time $W_{AVG}$ of a series of packets.

At 160, the wait time W is compared with a threshold wait time $W_T$. The comparison can be the calculated wait time W for the given packet, or it can be the moving average wait time $W_{AVG}$ calculated by the LPF. If the wait time W is greater than the threshold wait time $W_T$, indicated by YES, the method proceeds to 162. If the wait time W is not greater than the threshold wait time $W_T$, indicated by NO, the method proceeds back to 152. At 162, a shift time S is calculated. The shift time S can be based on both a maximum propagation delay and the wait time W or the moving average wait time $W_{AVG}$. The shift time S can be utilized by the DSP to delay production and transmission of subsequent packets, such that the subsequent packets are substantially synchronized with the polled transmission opportunities. At 164, a sync request is issued by the transmission device to the DSP. The sync request can include the calculated shift time S, such that the DSP can perform the sync operation.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A method for synchronizing packet production and receipt from a digital signal processor (DSP) with polled transmission opportunities in an IEEE 802.11(e) network, the method comprising:
   producing a packet via the DSP;
   transmitting the packet from the DSP to a transmission device at a time that is substantially synchronized with a next polled transmission opportunity granted by an access point in an IEEE 802.11(e) network;
   time stamping the arrival of the packet at the transmission device;
   transmitting the packet from the transmission device, time stamping the transmission of the packet by the transmission device;
   computing the wait time of the packet in the transmission device as the difference between the arrival time stamp and the transmission time stamp;
   comparing the wait time to a wait time threshold;
   determining a shift time based on the computed wait time upon the computed wait time being greater than the wait time threshold; and
   transmitting the shift time to the DSP in a synchronization request.

2. The method of claim 1, further comprising obtaining a moving average of a plurality of wait times.

3. The method of claim 1, further comprising waiting a predetermined number of packets before comparing the wait time to the wait time threshold upon transmitting the shift time to the DSP in the synchronization request.

4. The method of claim 1, further comprising:
   redefining transmission slots from the DSP to the transmission device for subsequent packets in response to the shift time transmitted from the transmission device; and
   using the redefined transmission slots to time the production and transmission of the subsequent packets from the DSP to the transmission device.

5. The method of claim 1, further comprising obtaining timing information associated with the polled transmission opportunities in a beacon frame, such that the computing the wait time comprises computing the wait time based on the obtained timing information associated with the polled transmission opportunities.

6. The method of claim 1, wherein transmitting the packet from the transmission device comprises continuously transmitting a plurality of packets from the transmission device.

7. The method of claim 6, further comprising:
monitoring the continuously transmitted plurality of packets, at least some of the continuously transmitted plurality of packets generating a synchronization request to the DSP, the plurality of packets being continuously transmitted by the transmission device according to polled transmission opportunities; and
producing the packets continuously by the DSP in fixed time slots until new slot timing information is transmitted in a synchronization request to the DSP by the transmission device.

8. The method of claim 7, further comprising:
analyzing timing of the arrival of the plurality of packet relative to timing of the polled transmission opportunities at the transmission device, and responsively identifying a need for new slot timing information;
calculating the new slot timing information upon identifying the need for new slot timing information; and
transmitting the new slot timing information with the synchronization request to the DSP.

9. A system for synchronizing the transmission of packets with polled transmission opportunities in a transmission device in an IEEE 802.11(e) network, the system comprising:
a digital signal processor (DSP) configured to produce the packets in fixed time slots; and
a transmission device configured to receive the packets transmitted from the DSP and to transmit the packets at the polled transmission opportunities granted by an access point in an IEEE 802.11(e) network, the transmission device comprising:
a calculator configured to determine a wait time between an arrival of each of the packets at the transmission device and the polled transmission opportunities; and
a synchronizer configured to transmit a sync request to the DSP, such that the DSP is further configured to adjust the production and transmission of the packets based on the determined wait time.

10. The system of claim 9, wherein the synchronizer is further configured to redefine the fixed time slots of the production of the packets to minimize the wait time.

11. The system of claim 9, wherein the transmission device is further configured to time stamp the arrival of each of the packets transmitted from the DSP and time stamp the transmission of each of the packets from the transmission device, such that the calculator determines the wait time of each of the packets based on the difference between the time stamps.

12. The system of claim 11, wherein the transmission device further comprises a low-pass filter configured to obtain a moving average of the wait times of each of the packets.

13. The system of claim 9, wherein the synchronizer is further configured, upon the wait time exceeding a predetermined threshold wait time, to calculate a shift time based on the wait time and transmit the shift time to the DSP in a synchronization request, such that the DSP is further configured to redefine transmission slots from the DSP to the transmission device for the production and transmission of subsequent packets in response to the synchronization request.

14. The system of claim 9, wherein timing information associated with the polled transmission opportunities is obtained by the transmission device in a beacon flame, such that the calculator determines the wait time based on the obtained timing information.

* * * * *